US 6,707,215 B2

(12) United States Patent
Nishimura

(10) Patent No.: US 6,707,215 B2
(45) Date of Patent: Mar. 16, 2004

(54) STATOR OF A ROTATING ELECTRIC MACHINE

(75) Inventor: Shinji Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/983,411

(22) Filed: Oct. 24, 2001

(65) Prior Publication Data

US 2002/0053853 A1 May 9, 2002

(30) Foreign Application Priority Data

Nov. 9, 2000 (JP) ........................................ 2000-342079

(51) Int. Cl.[7] .............................................. H02K 17/00
(52) U.S. Cl. ...................................... 310/201; 310/208
(58) Field of Search ................................. 310/208, 201

(56) References Cited

U.S. PATENT DOCUMENTS

| 5,331,244 | A | * | 7/1994 | Rabe | .......................... | 310/180 |
| 6,011,339 | A | * | 1/2000 | Kawakami | ................... | 310/208 |
| 6,252,327 | B1 | * | 6/2001 | Matsuzaki | ................... | 310/201 |
| 6,373,164 | B1 | * | 4/2002 | Nishimura | ................... | 310/207 |
| 6,445,102 | B1 | * | 9/2002 | Grundl et al. | ............... | 310/201 |

OTHER PUBLICATIONS

U.S. application No. 09/587,513 filed Jun. 5, 2000 by Kusumoto, et al.
U.S. application No. 09/784,050 filed Feb. 16, 2001 by Kusumoto, et al.

* cited by examiner

Primary Examiner—Dang Le
(74) Attorney, Agent, or Firm—Sughrue Mion, PLLC

(57) ABSTRACT

A stator of a rotating electric machine is obtained which has a winding improved in assemblability. The stator has three phase winding 10 which has respective phase winding sections 11 through 13 electrically connected with each other, the respective phase winding sections 10 through 13 including straight portions 11a through 13a of a rectangular cross section inserted in the slots and connecting portions 11b through 13b connecting between ends of adjacent ones of the straight portions 11a through 13a. The respective phase winding sections includes a plurality of conductor segment units wound in a spiral manner with four corners each bent substantially at right angles. The respective phase winding sections have the straight portions 11a through 13a and the connecting portions 11b through 13b. The conductor segment units are laminated in such a manner that parts of connecting portions 11b through 13b of one of any two adjacent conductor segment units are interposed between adjacent connecting portions 11b through 13b of the other adjacent conductor segment unit, and the conductor segment units are serially linked with one another in a circumferential direction.

11 Claims, 20 Drawing Sheets

STATOR OF A ROTATING ELECTRIC MACHINE

This application is based on Application No. 2000-342079, filed in Japan on Nov. 9, 2000, the contents of which are hereby incorporated by reference.

BACKGROUND OF THE INVENTION

1. Field of the Invention

The present invention relates to a stator of a rotating electric machine in which windings are incorporated in a stator core having a plurality of axially extending slots formed in a circumferentially spaced apart relation with respect one another.

2. Description of the Related Art

FIGS. 19 and 20 illustrate a known rotating electric machine in the form of a generator motor, in which FIG. 19 is a front elevation of essential portions of a stator of the generator motor, and FIG. 20 is a front elevation of a conductor which constitutes a winding of the stator of FIG. 19.

The stator 1 of this rotating electric machine includes a stator core 3 formed of laminated silicon steel plates and having axially extending slots 2 formed in a circumferentially spaced apart relation with respect to one another, a winding 4 fitted in the slots 2, and wedges 5 each fixed to an entrance portion 6 of a corresponding slot 2 for preventing the winding 4 from projecting from the slots in a radially inward direction.

The winding 4 is comprised of respective phase winding Sections 7 of a U phase, a V phase and a W phase. The respective phase winding sections 7 each have a winding main body of copper, the surface of which is coated with enamel and which meanders like a crank. The winding sections 7 each includes straight portions 8 acting as slot insertion portions, and connecting portions 9 connecting between ends of adjacent straight portions 8. The winding sections 7 are formed by sequentially inserting the straight portions 8 into the slots 2 in the stator core 3 so as to wind around the stator core 3 six turns in a wavelike manner. The straight portions 8 of the respective phase winding sections 7 are inserted in the respective slots 2 at an electrical angle of 120 degrees apart from one another.

With the stator of the generator motor as constructed above, since serially linked crank-shaped respective phase winding sections 7 are intertwined with one another to produce the winding 4, there arises a problem that assemblability of the stator is poor.

SUMMARY OF THE INVENTION

The present invention is intended to obviate the problem as referred to above, and has for its object to provide a stator of a rotating electric machine of which assembling performance or efficiency is substantially improved.

Bearing the above object in mind, the present invention resides in a stator of a rotating electric machine comprising a stator core having slots formed therein which extend in an axial direction and arranged in a circumferentially spaced apart relation with respect to one another, and a polyphase winding incorporated in the slots. The polyphase winding is comprised of respective phase winding sections electrically connected with each other, the respective phase winding sections having straight portions inserted in the slots and connecting portions connecting between ends of adjacent ones of the straight portions. The respective phase winding sections include a plurality of conductor segment units wound with four corners each bent substantially at right angles, the respective phase winding sections having the straight portions and the connecting portions. The conductor segment units are laminated in such a manner that parts of connecting portions of one of any two adjacent conductor segment units are interposed between adjacent connecting portions of the other adjacent conductor segment unit, and the conductor segment units are serially linked with one another in a circumferential direction.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 19:
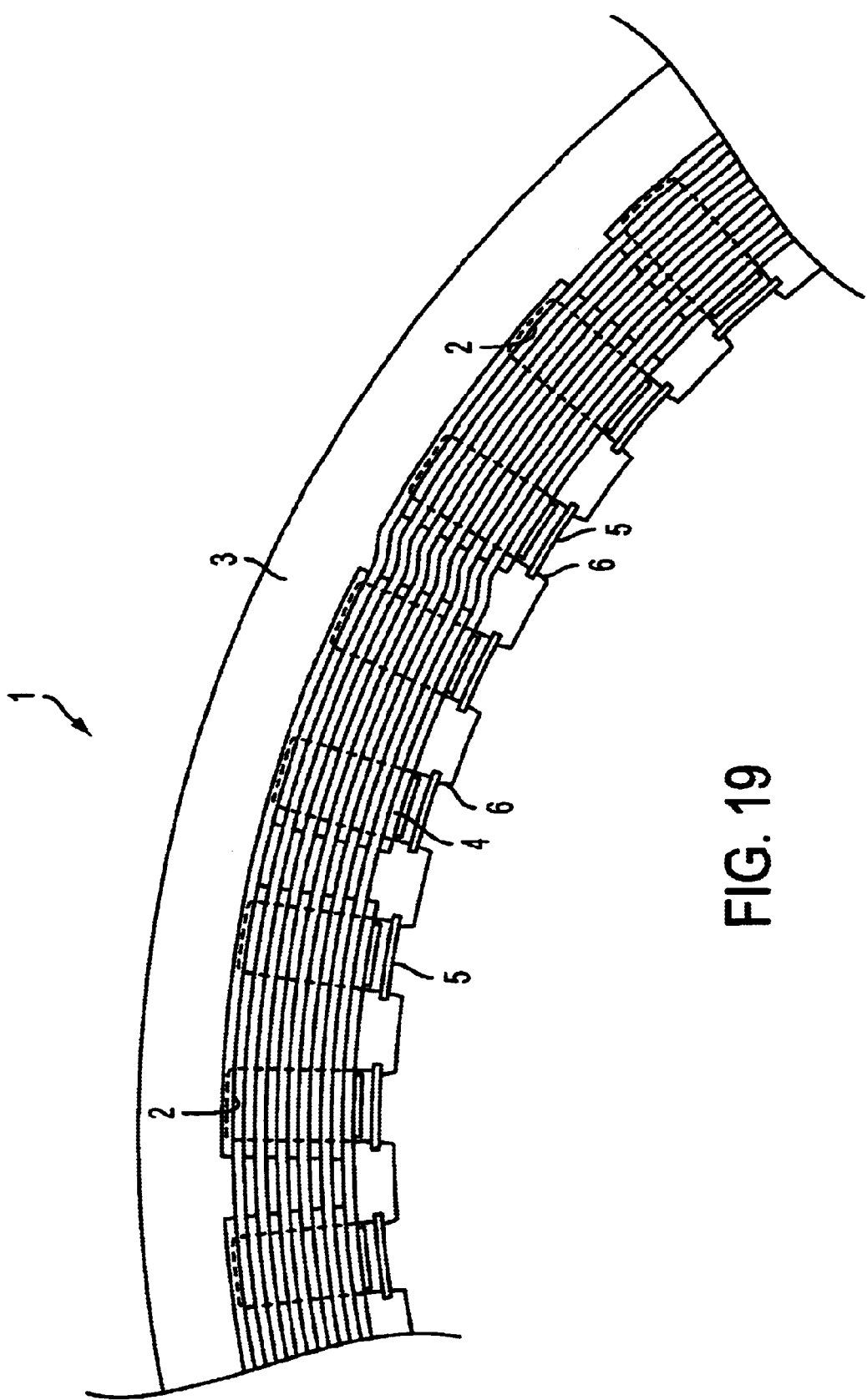
FIG. 19 is a front elevation of essential portions of a stator of a known generator motor.
Figure 20:
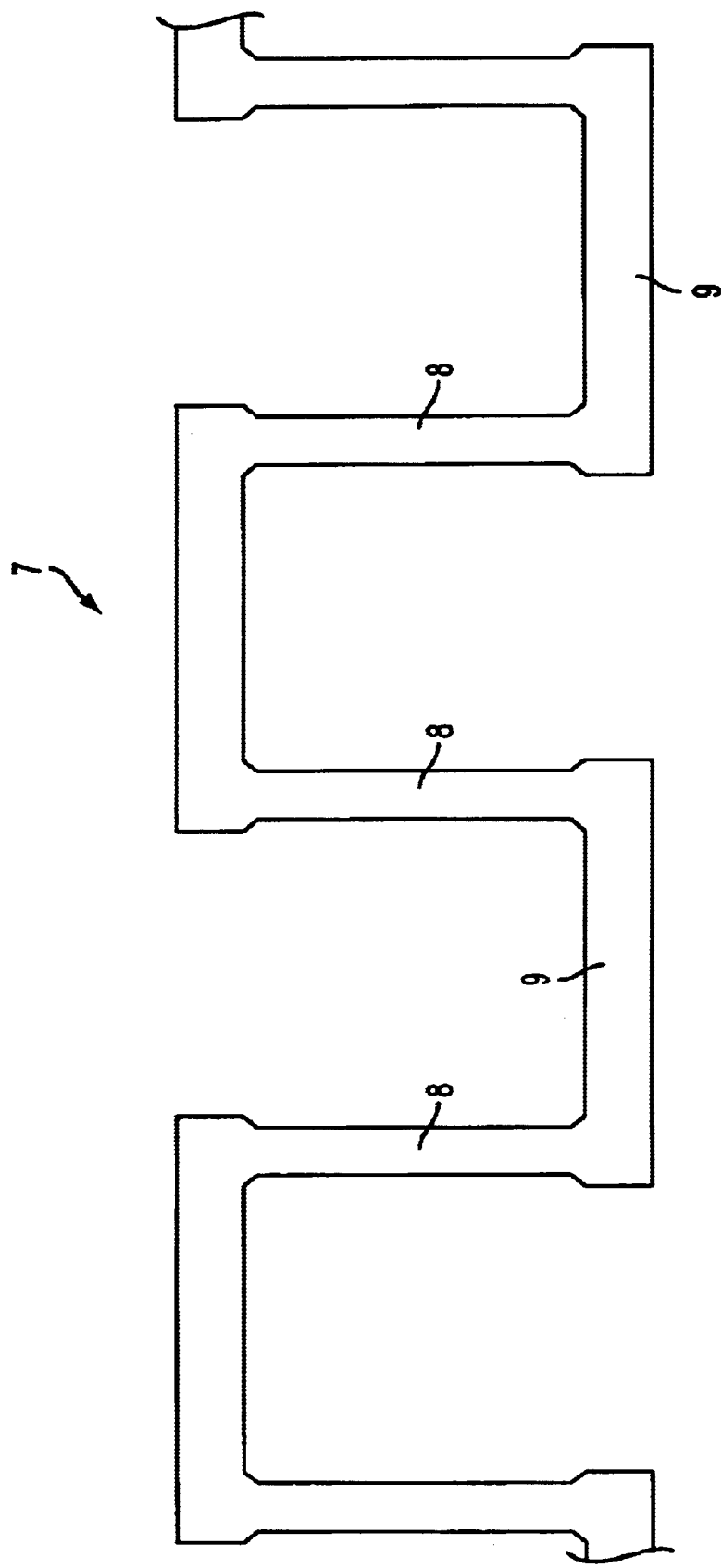
FIG. 20 is a front elevation of a conductor which is a component element of a three phase winding of FIG. 19.

Now, preferred embodiments of the present invention will be described in detail while referring to accompanying drawings. The following description will be made by identifying the same or corresponding parts as those of FIG. 19 and FIG. 20 by the same symbols.

Embodiment 1

Figure 1:
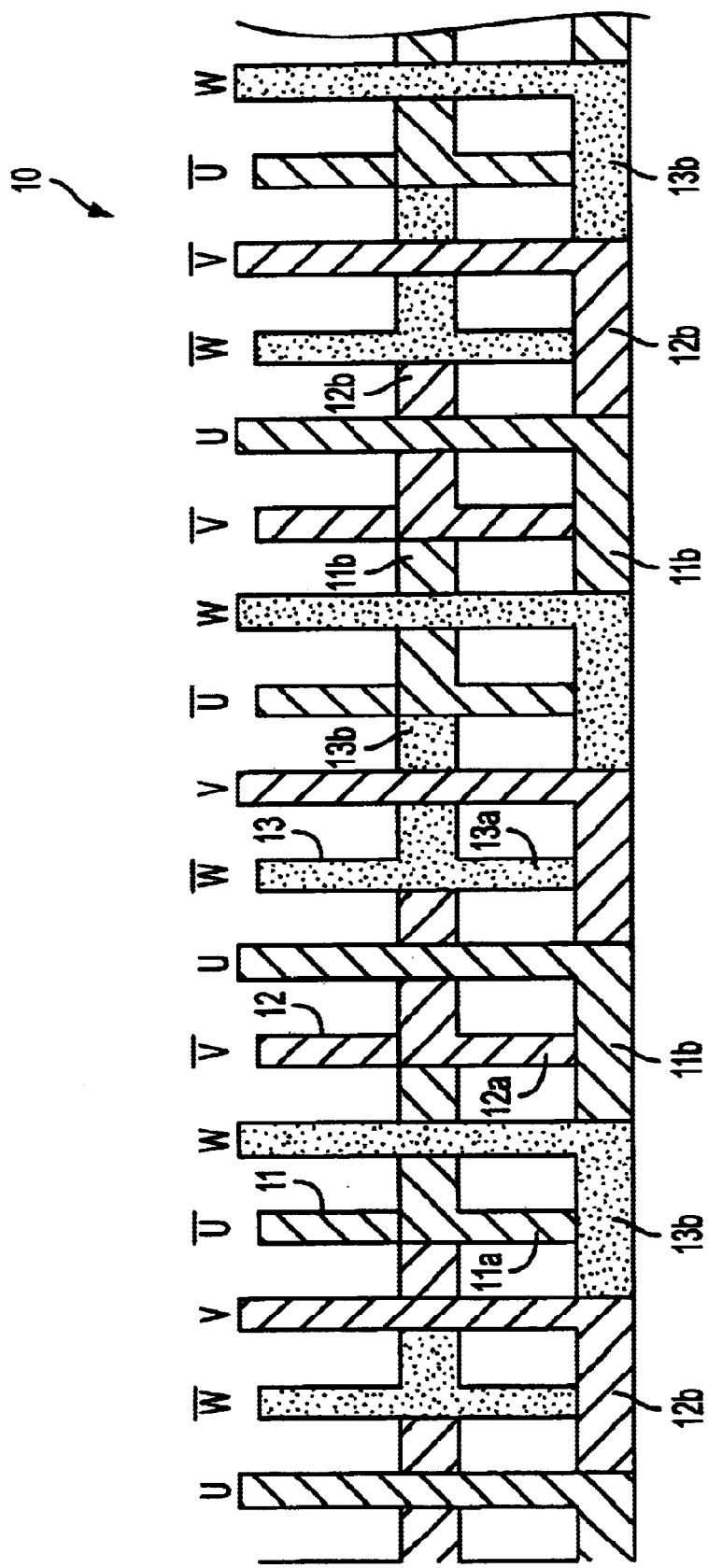
FIG. 1 is a development front elevation of a three phase winding of a generator motor according to a first embodiment of the present invention.
Figure 2:
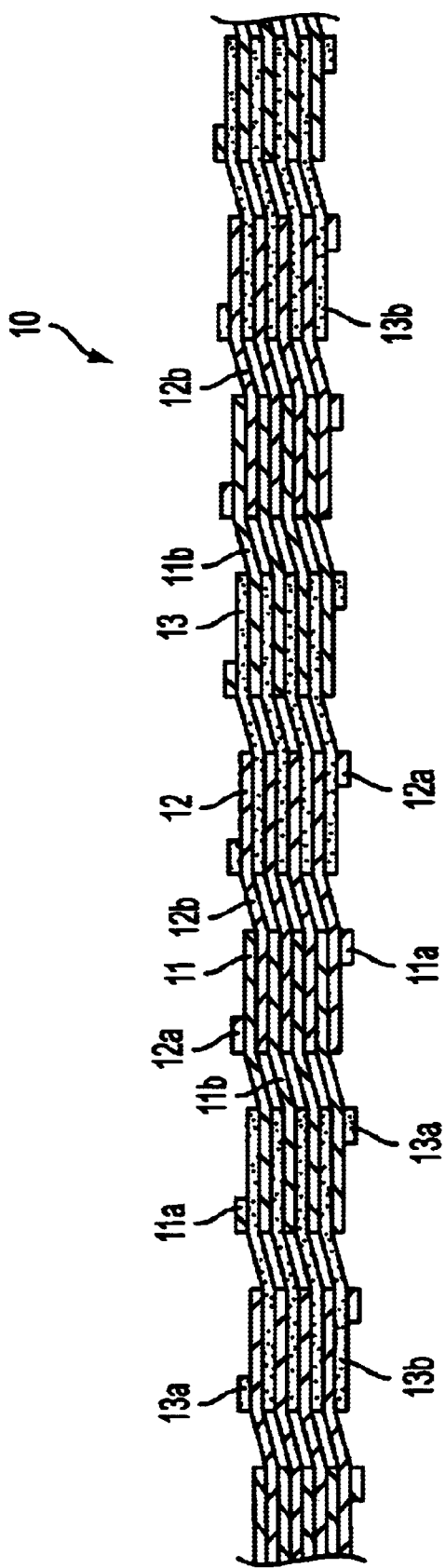
FIG. 2 is a plan view of the three phase winding of FIG. 1.
Figure 3:
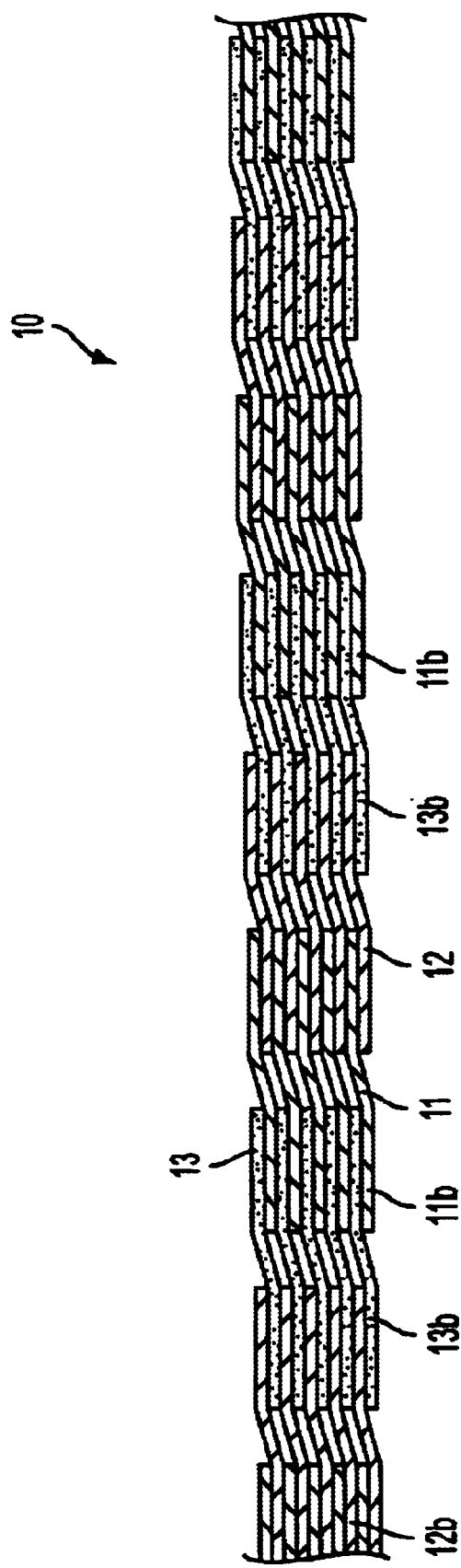
FIG. 3 is a bottom view of the three phase winding of FIG. 1.

FIG. 1 is a development front elevation of a three phase winding of a rotating electric machine in the form of a generator motor constructed in accordance with a first embodiment of the present invention. FIG. 2 is a plan view of the three phase winding of FIG. 1. FIG. 3 is a bottom view of the three phase winding of FIG. 1.

The stator of this generator motor includes a stator core 3 having slots 2 formed in such a manner that the number of slots for each pole and each phase is one, and a polyphase winding in the form of a three phase winding 10 incorporated in the stator core 3.

The three phase winding 10 is comprised of a U phase winding section 11, a V phase winding section 12 and a W phase winding section 13. The respective phase winding sections 11, 12, 13 each have a winding section main body of copper, the surface of which is coated with enamel. The respective winding sections 11, 12, 13 include respective straight portions 11a, 12a, 13a inserted in the slots 2 of the stator core 3, and connecting portions 11b, 12b, 13b connecting between the ends of adjacent respective straight portions 11a, 12a, 13a. The respective winding sections 11, 12, 13 are constructed by inserting respective straight portions 11a, 12a, 13a sequentially into the slots 2 to wind around the stator core 3 four turns in a wavelike fashion. The respective straight portions 11a, 12a, 13a are inserted in the respective slots 2 at an electrical angle of 120 degrees apart from one another.

Figure 5A:
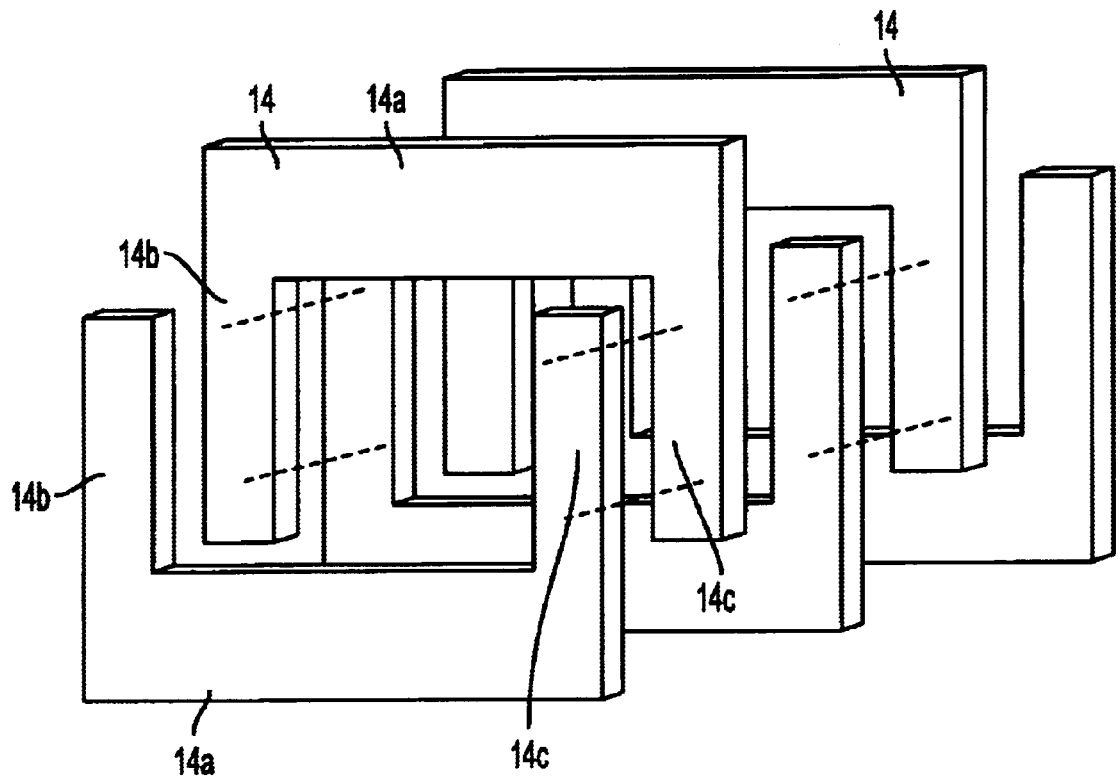
FIG. 5(A) is a perspective view illustrating a conductor segment unit in the course of assembly thereof according to the first embodiment.
Figure 5B:
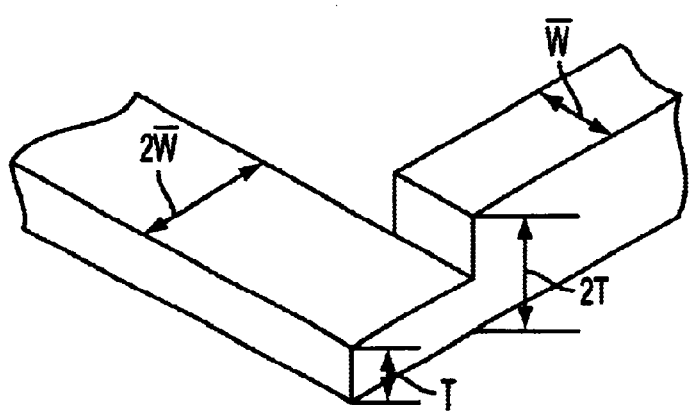
FIG. 5(B) is an enlarged fragmentary perspective view of the conductor segment unit of FIG. 5(A).

The respective straight portions 11a, 12a, 13a each have a width equal to a half of that of the connecting portions 11b, 12b, 13b, a thickness twice as large as that of the latter, and a sectional area equal to that of the latter (see FIG. 5(B)).

Next, reference will be made to the manufacturing procedure of the respective winding sections 11, 12, 13.

Figure 4:
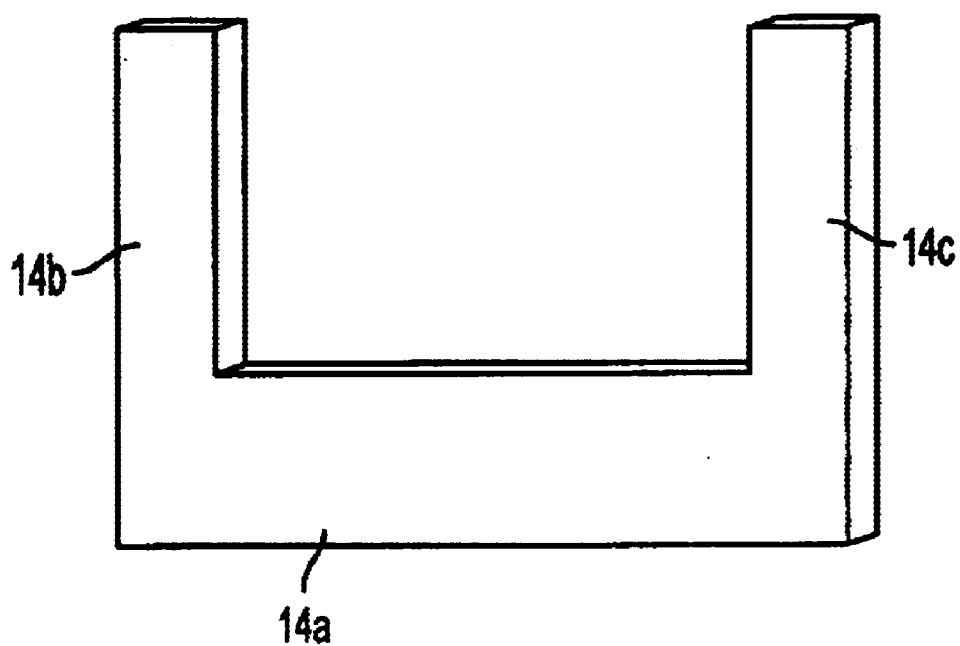
FIG. 4 is a perspective view of a conductor segment which is a component element of the three phase winding of FIG. 1.
Figure 6:
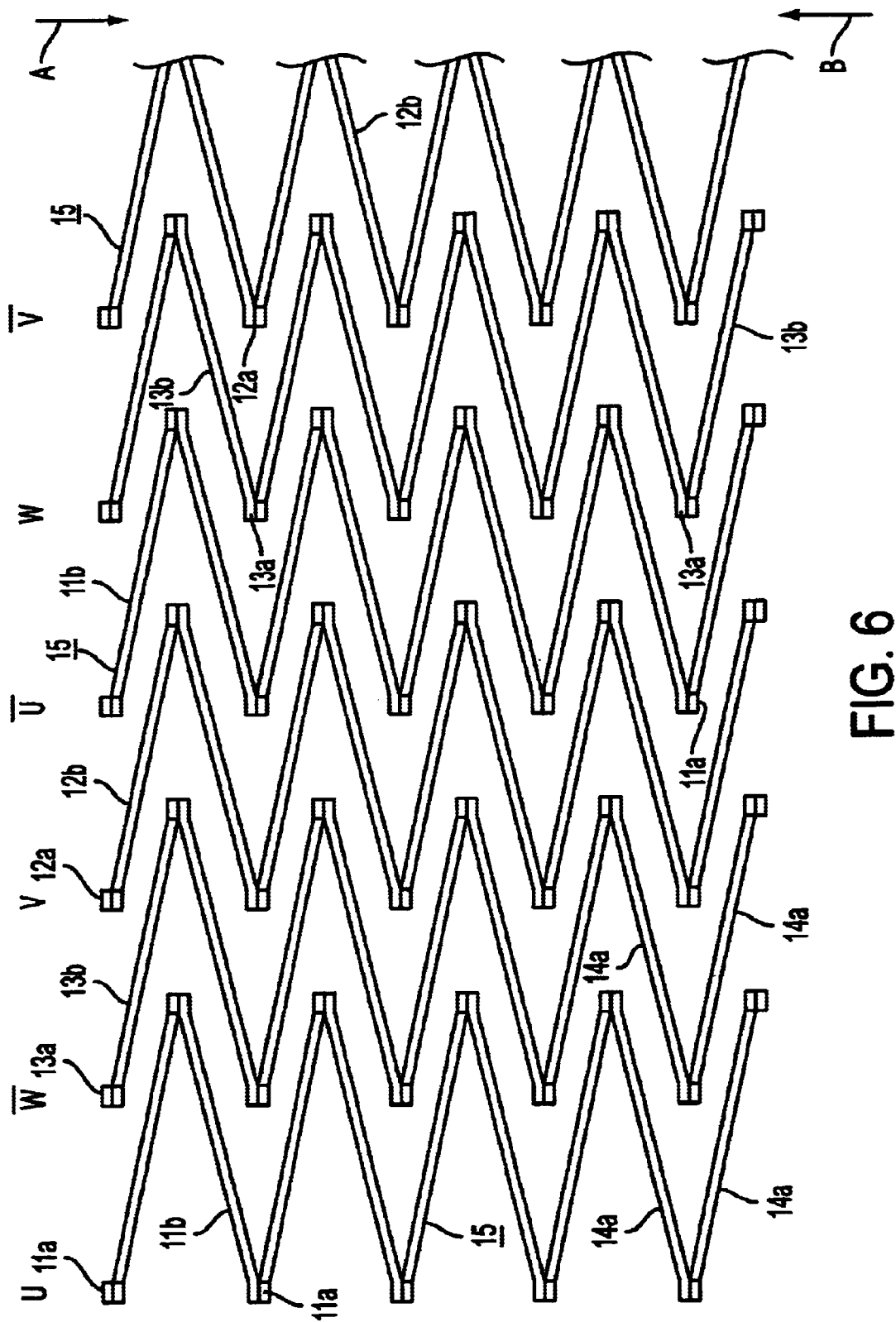
FIG. 6 is a plan view of the three phase winding in the course of manufacture thereof according to the first embodiment.

First of all, a copper plate is pressed to form a plurality of conductor segments 14 as illustrated in FIG. 4. Then, the conductor segments 14 each of a U-shaped configuration as a whole including a base 14a and a pair of leg portions 14b, 14c are arranged in an alternately reversed manner, i.e., alternately reversed at an angle of 180 degrees from one another. Thereafter, nine mutually opposed conductor segments 14 are connected with one another by alternately welding the leg portions 14b, 14c of adjacent conductor segments 14 at their one side alone through brazing, and insulating the whole surfaces thereof (for instance, coating them with enamel by dip brazing) to form a conductor segment unit 15 as illustrated in FIG. 6. Note that such welding may be ultrasonic welding instead of brazing.

Here, it is to be noted that in the conductor segment unit 15, those parts at which the adjacent leg portions 14b, 14c are mutually joined to each other and which are coated with enamel correspond to the straight portions 11a, 12a, 13a of the winding sections 11, 12, 13, and those parts of the bases 14a which are coated with enamel correspond to connecting portions 11b, 12b, 13b of the winding sections 11, 12, 13.

Then, a plurality of conductor segment units 15 are prepared and arranged in such a manner that the bases 14a of the conductor segments 14 of the respective conductor segment units 15 are disposed apart from one another in a zigzag form as shown in FIG. 6, and the conductor segment units 15 are superposed one over another with the bases 14a of the respective conductor segments 14 being inserted into corresponding V-shaped spaces formed between adjacent leg portions 14b, 14c of adjacent conductor segment units 15. Thereafter, the respective conductor segment units 15 are urged in opposite directions designated at arrows A and B in FIG. 6, thereby combining the respective winding sections 11, 12, 13 with one another to form a three phase winding 10.

With the three phase winding 10 of the stator as constructed above, the plurality of conductor segment units 15 are laminated in such a manner that parts of the connecting portions 11b, 12b, 13b of one of any two adjacent conductor segment units 15 are interposed between the connecting portions 11b, 12b, 13b of the other adjacent conductor segment unit 15, with the conductor segment units 15 being chained or linked serially with one another in a circumferential direction. As a result, the manufacturing efficiency of the stator according to this embodiment can be improved greatly in comparison with the aforementioned known stator in which the serially linked respective phase winding sections 7 each of a crank-shaped configuration are intertwined with one another to form the winding 4.

Moreover, the conductor segments 14, which are the component elements of the three phase winding 10, are easily formed by press molding.

Embodiment 2

Figure 7:
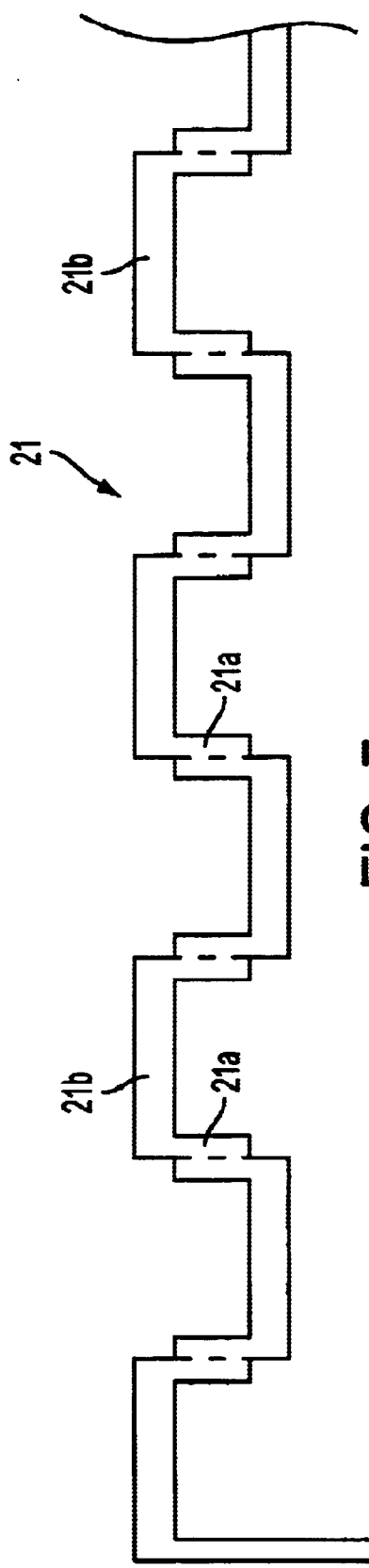
FIG. 7 is a plan view of a bare conductor which is a component element of a three phase winding according to a second embodiment of the present invention.
Figure 8:
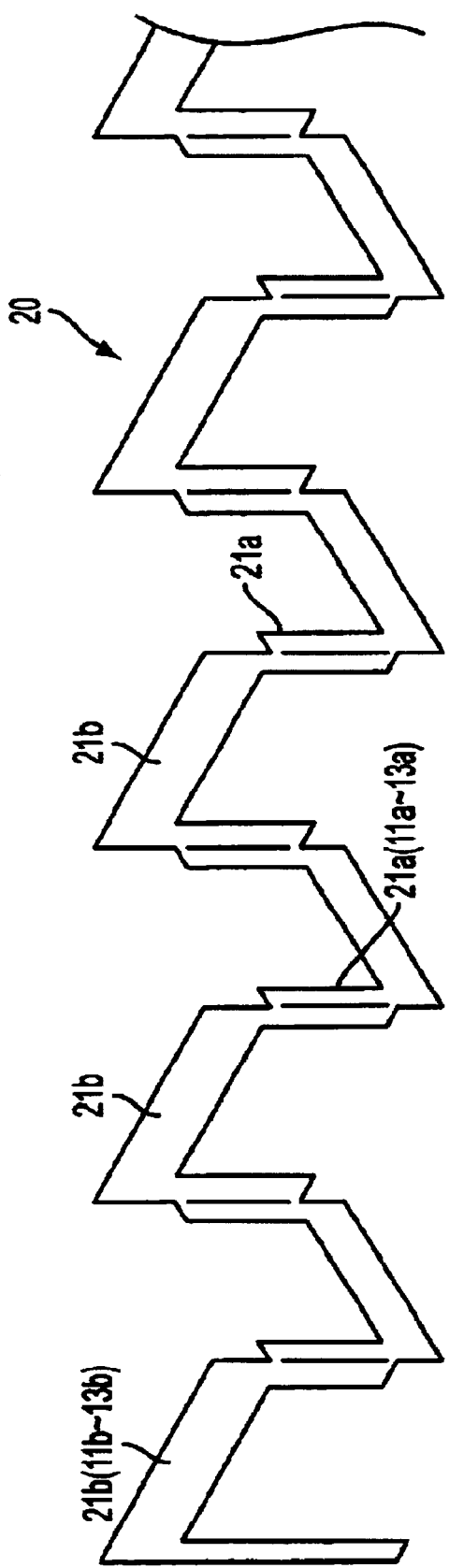
FIG. 8 is a perspective view illustrating a conductor segment unit in the course of assembly thereof according to the second embodiment.

In a second embodiment of the present invention, a bare conductor 21 of a crank-shaped configuration illustrated in FIG. 7 is formed by press working. This bare conductor 21 has bending portions 21a and connecting portions 21b connecting adjacent bending portions 21a with each other. The bending portions 21a of the bare conductor 21 are bent at dotted line parts to form a conductor segment unit 20, as depicted in FIG. 8. In the conductor segment unit 20, the bending portions 21a correspond to the straight portions 11a, 12a, 13a of the winding sections 11, 12, 13, and the connecting portions 21b correspond to the connecting portions 11b, 12b, 13b of the winding sections 11, 12, 13.

In this second embodiment, the welding process, which is required in the first embodiment when the conductor segment unit 20 are formed, is unnecessary. In the manufacture of the three phase winding 10, the processes after the formation of the conductor segment units 20 are similar to those in the first embodiment, and hence a description thereof is omitted.

Embodiment 3

Figure 9:
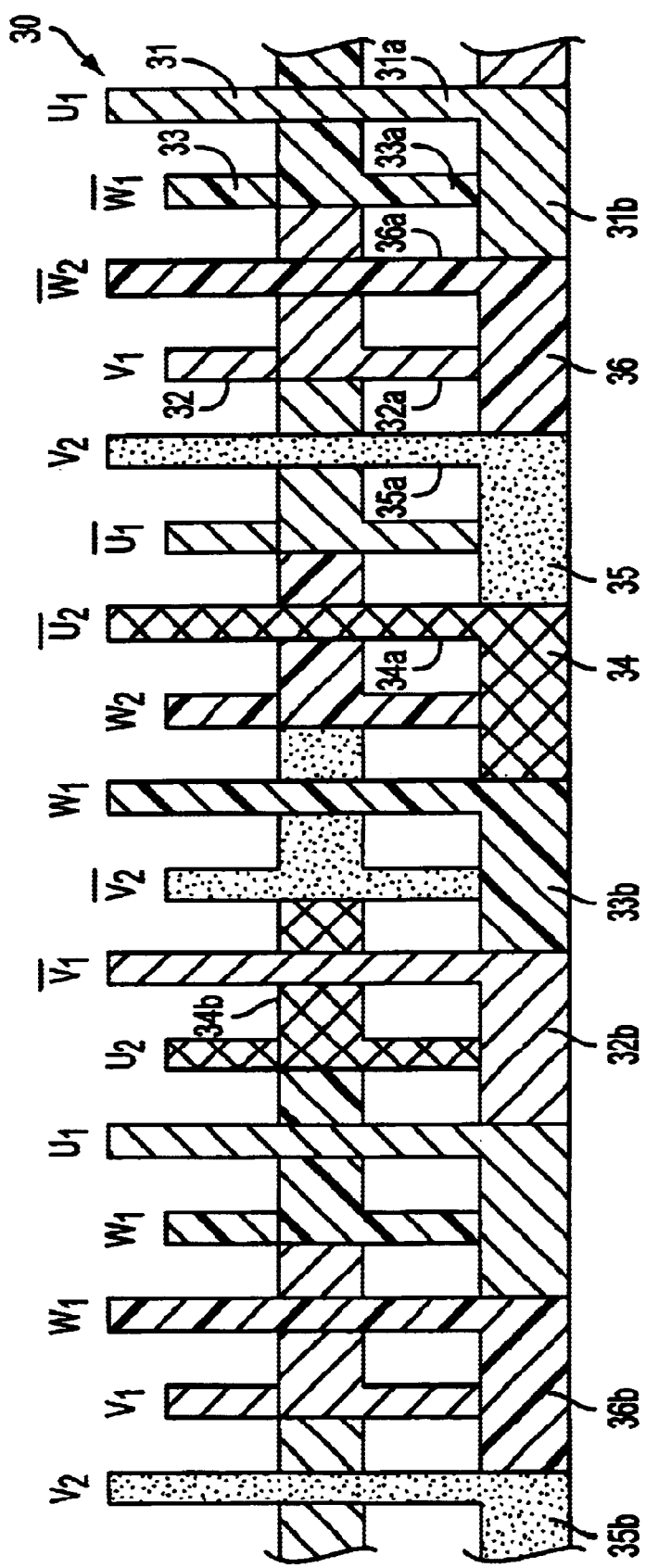
FIG. 9 is a development front elevation of a three phase winding of a generator motor according to a third embodiment of the present invention.
Figure 10:
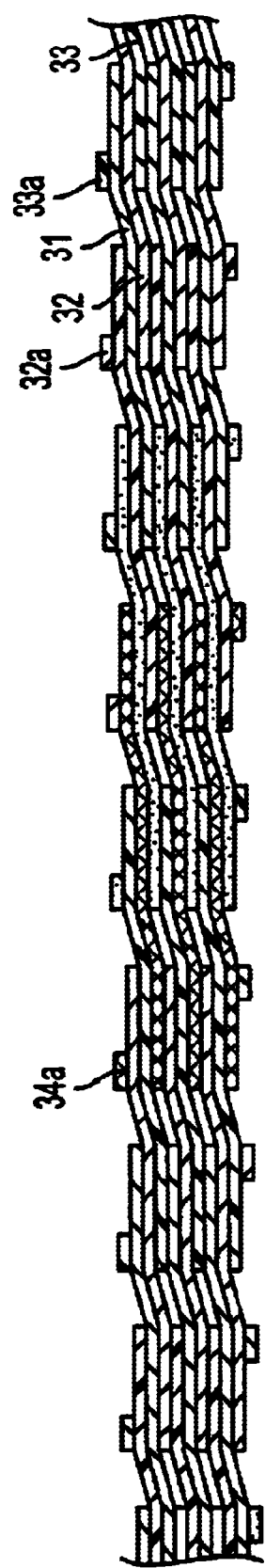
FIG. 10 is a plan view of the three phase winding of FIG. 9.
Figure 11:
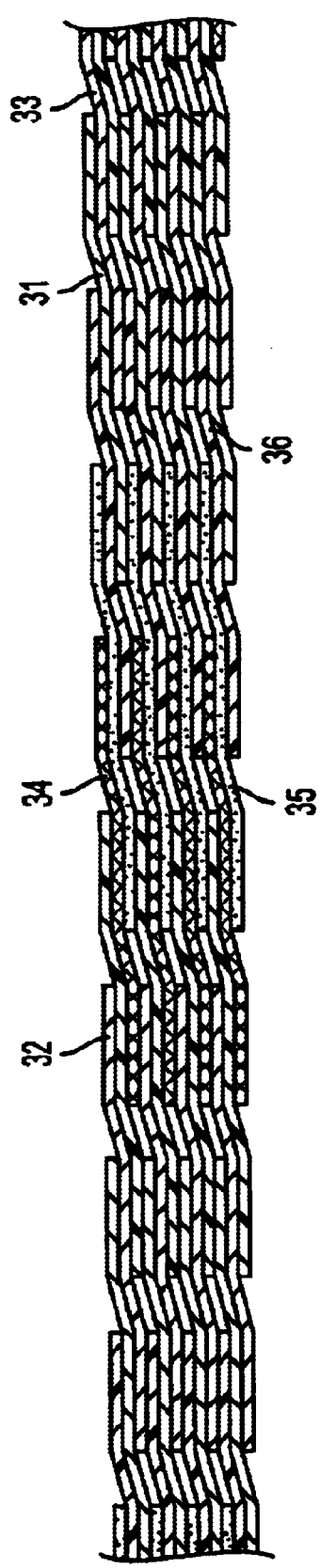
FIG. 11 is a bottom view of the three phase winding of FIG. 9.

FIGS. 9, 10 and 11 illustrate a three phase winding of a rotating electric machine in the form of a motor generator constructed in accordance with a third embodiment of the present invention, in which FIG. 9 is a plan view of the three phase winding; FIG. 10 is a plan view thereof; and FIG. 11 is a bottom view thereof.

The motor generator has a stator comprising a stator core 3 having slots 2 formed therein, where the number of slots 2 for each pole and each phase is two, and a three phase winding 30 incorporated in the stator core 3 by distributed winding.

The three phase winding 30 is comprised of a $U_1$ phase winding section 31, a $V_1$ phase winding section 32, a $W_1$ phase winding section 33, a $U_2$ phase winding section 34, a $V_2$ phase winding section 35 and a $W_2$ phase winding section 36. The respective phase winding sections 31 through 36 each have a winding section main body of copper, the surface of which is coated with enamel. The respective phase winding sections 31 through 36 include respective straight portions 31a through 36a inserted in the slots 2 of the stator core 3, and connecting portions 31b through 36b connecting between the ends of adjacent respective straight portions 31a through 36a. The respective phase winding sections 31 through 36 are constructed by inserting respective straight portions 31a through 36a sequentially into the slots 2 to wind around the stator core 3 four turns in a wavelike fashion. The respective straight portions 31a through 36a are inserted in the respective slots 2 at an electrical angle of 120 degrees apart from one another.

Figure 12A:
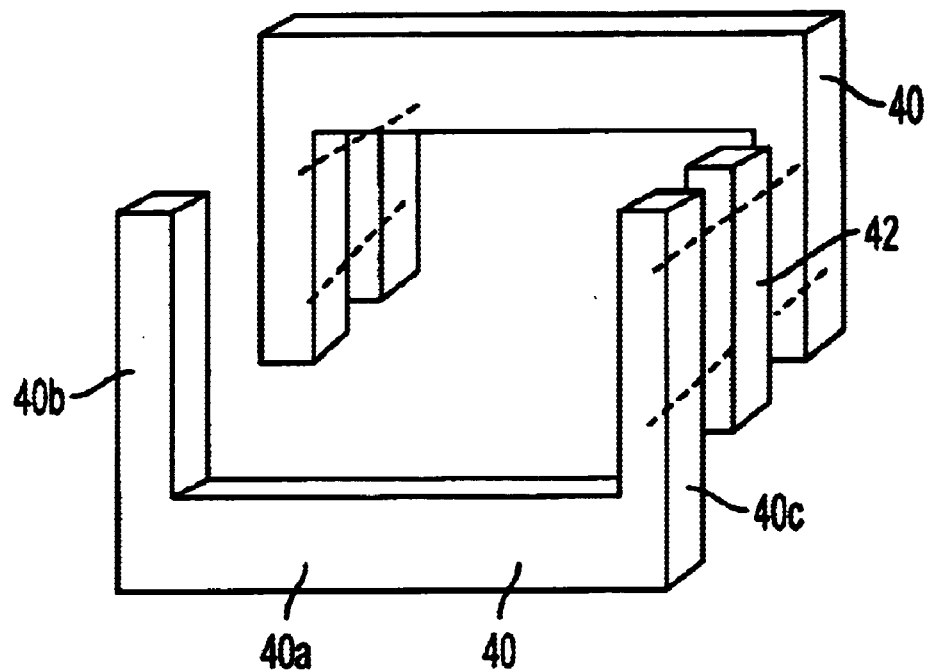
FIG. 12(A) is a perspective view illustrating a conductor segment unit in the course of assembly thereof according to the third embodiment.
Figure 12B:
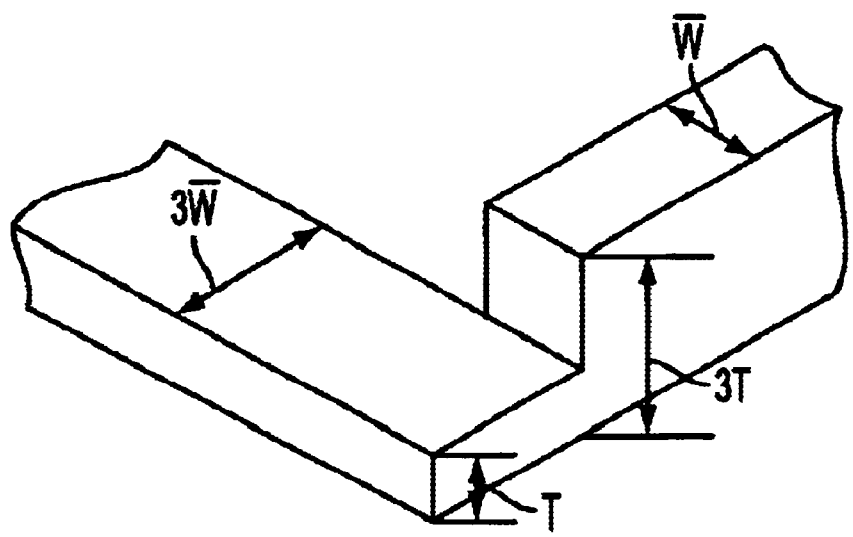
FIG. 12(B) is an enlarged fragmentary perspective view of the conductor segment unit of FIG. 12(A).
Figure 13:
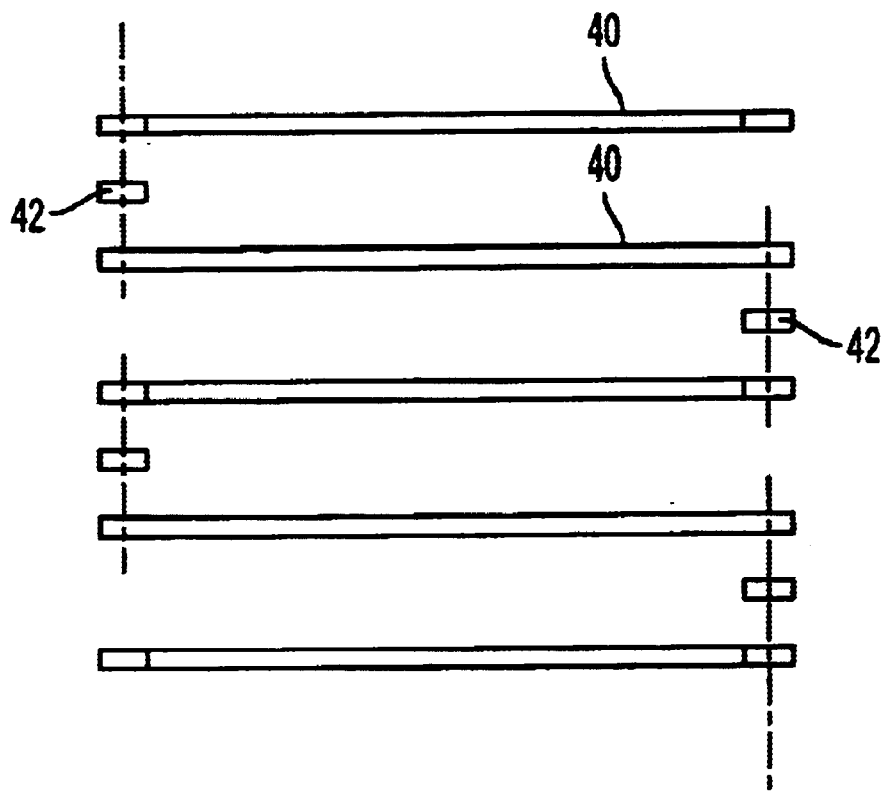
FIG. 13 is a plan view of the conductor segment unit of FIG. 12.

The respective straight portions 31a through 36a each have a width equal to one third of that of the connecting portions 31b through 36b, a thickness thrice as large as that of the latter, and a sectional area equal to that of the latter (see FIG. 12(B)).

Next, reference will be made to the manufacturing procedure of the respective phase winding sections 31 through 36.

First of all, a copper plate is pressed to form a plurality of conductor segments 40 as illustrated in FIG. 12(A). Then, the conductor segments 40 each of a U-shaped configuration as a whole having a base 40a and a pair of leg portions 40b, 40c are arranged in an alternately reversed manner, i.e., alternately reversed at an angle of 180 degrees from one another. Thereafter, five mutually opposed conductor segments 40 are connected with one another by alternately welding adjacent leg portions 40b, 40c of adjacent conductor segments 40 at their one side alone via interposing portions 42 through brazing, and insulating the whole surfaces thereof (for instance, coating them with enamel by dip brazing) to form a conductor segment unit 41 as illustrated in FIG. 14.

Here, it is to be noted that in the conductor segment unit 41, those parts at which the leg portions 40b, 40c are joined to each other and which are coated with enamel, as well as those parts of the interposing portions 42 welded to the joined portions of the leg portions which are coated with enamel, correspond to the straight portions 31a through 36a of the respective phase winding sections 31 through 36, and those parts of the bases 40a which are coated with enamel correspond to the connecting portions 31b through 36b of the respective phase winding sections 31 through 36.

Figure 14:
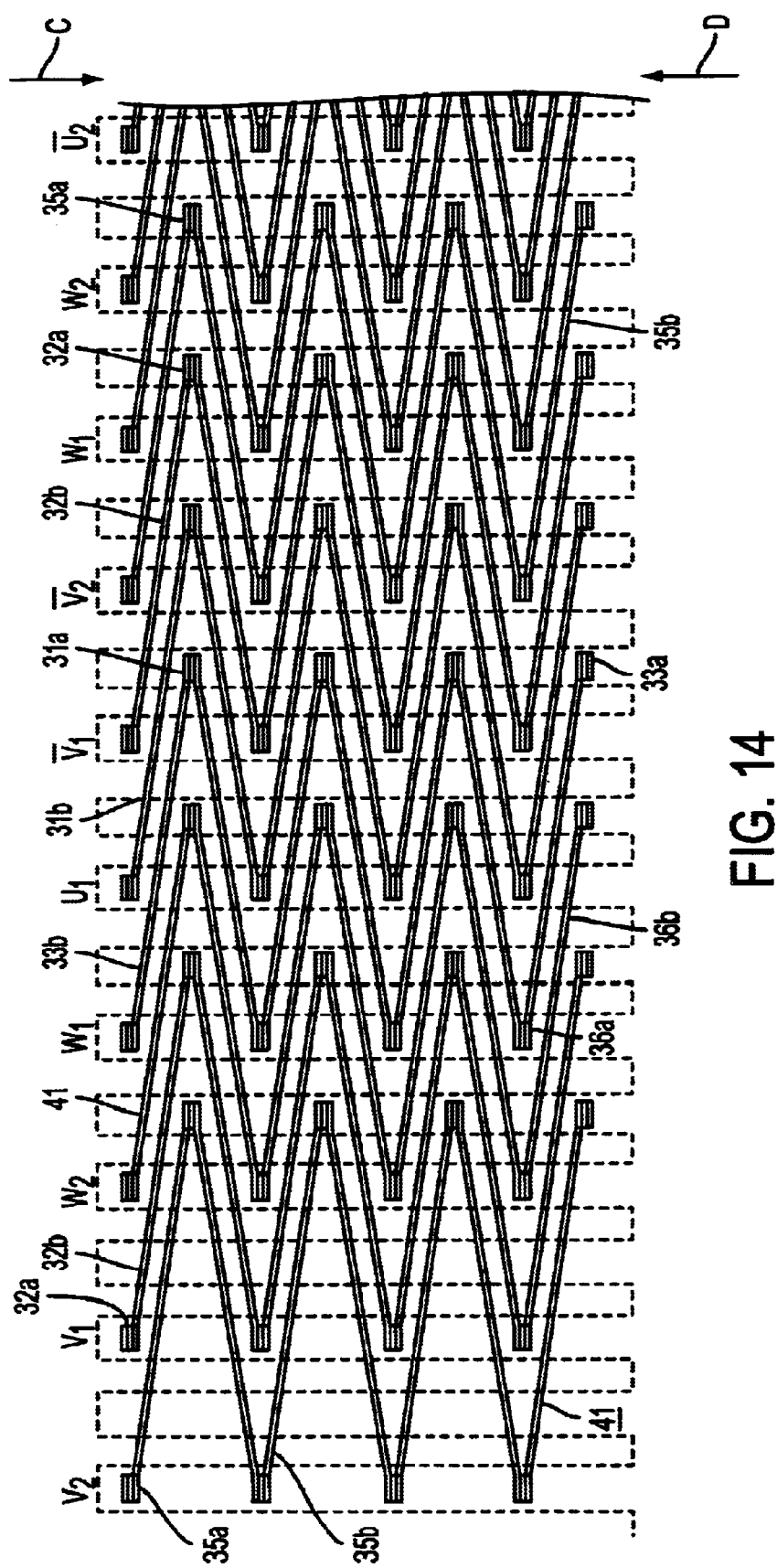
FIG. 14 is a plan view of the three phase winding in the course of manufacture thereof according to the third embodiment.

Then, a plurality of conductor segment units 41 are prepared and arranged in such a manner that the bases 40a of the conductor segments 40 of the respective conductor segment units 41 are disposed apart from one another in a zigzag form as shown in FIG. 14, and the conductor segment units 41 are superposed one over another with the bases 40a of the respective conductor segments 40 being inserted into corresponding V-shaped spaces formed between adjacent leg portions 40b, 40c of adjacent conductor segment units 41. Thereafter, the respective conductor segment units 41 are urged in opposite directions designated at arrows C and D in FIG. 14, thereby combining the respective phase winding sections 31 through 36 with one another to form a three phase winding 30.

With the three phase winding 30 of the stator as constructed above, the plurality of conductor segment units 41 are laminated in such a manner that parts of the connecting portions 31b through 36b of one of any two adjacent conductor segment units 41 are interposed between the connecting portions 31b through 36b of the other adjacent conductor segment unit 41, with the conductor segment units 41 being chained or linked serially with one another in a circumferential direction. Consequently, the manufacturing efficiency of the stator according to this embodiment can be improved greatly in comparison with the aforementioned known stator in which the serially linked respective phase winding sections 7 each of a crank-shaped configuration are intertwined with one another to form the winding 4.

Moreover, the conductor segments 40, which are the component elements of the three phase winding 30, are easily formed by press molding.

Figure 15:
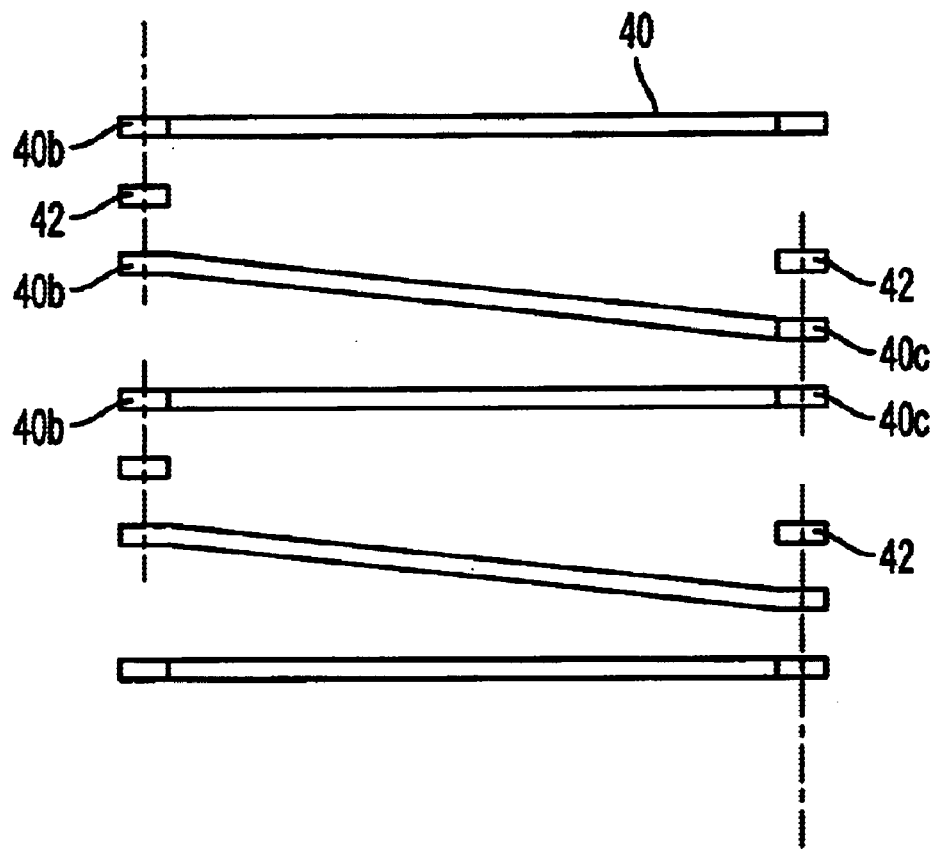
FIG. 15 is a plan view of another example of a conductor segment unit in the course of assembly thereof.
Figure 16:
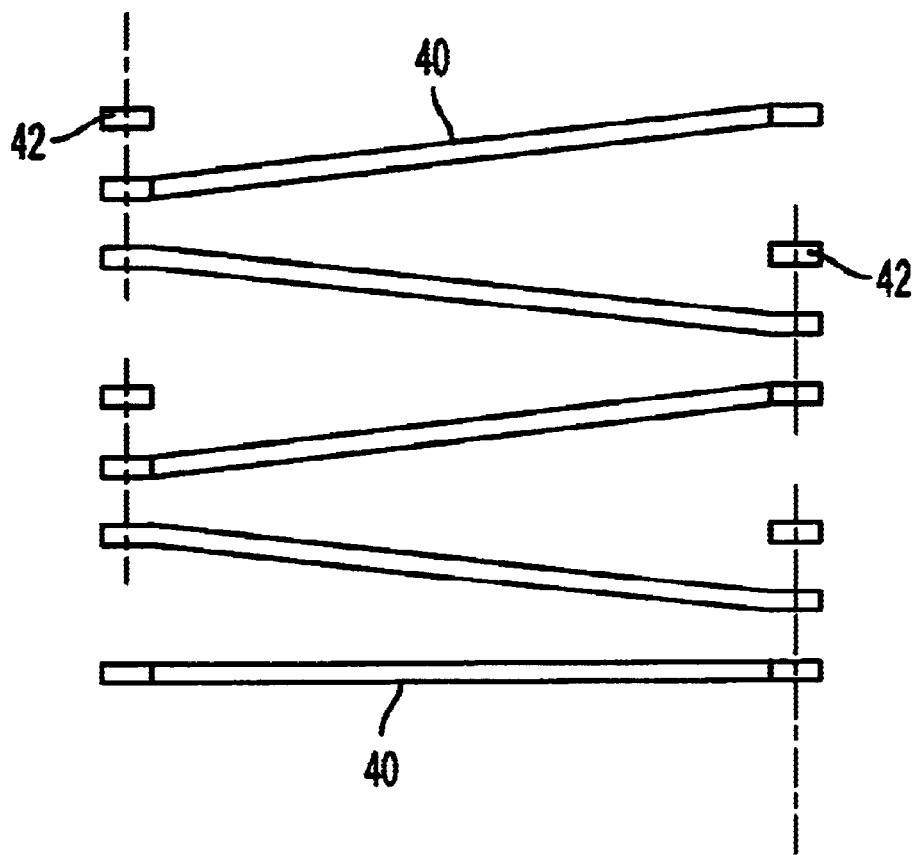
FIG. 16 is a plan view of a further example of a conductor segment unit in the course of assembly thereof.

Here, it is to be noted that the interposing portions 42, which act as adjustment members for adjusting the cross sectional shapes of the straight portions 31a through 36a, may be positioned at one side thereof between the adjacent leg portions 40b of the conductor segments 40, and at the other side thereof outside the leg portions 40c to be joined, as shown in FIG. 15. Alternatively, the interposing portions 42 may instead be positioned at opposite sides thereof outside the leg portions 40c to be joined.

Embodiment 4

Figure 17:
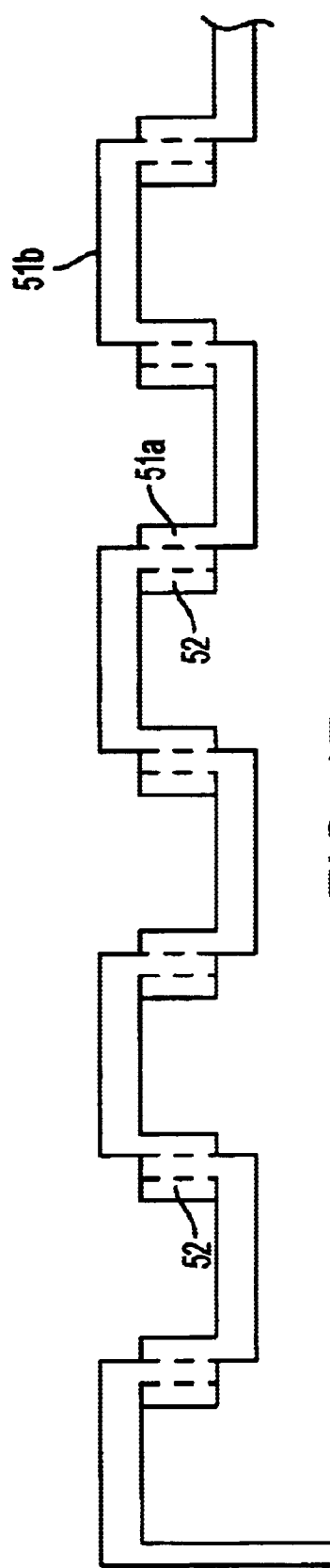
FIG. 17 is a plan view of a bare conductor which is a component element of a three phase winding according to a fourth embodiment of the present invention.
Figure 18:
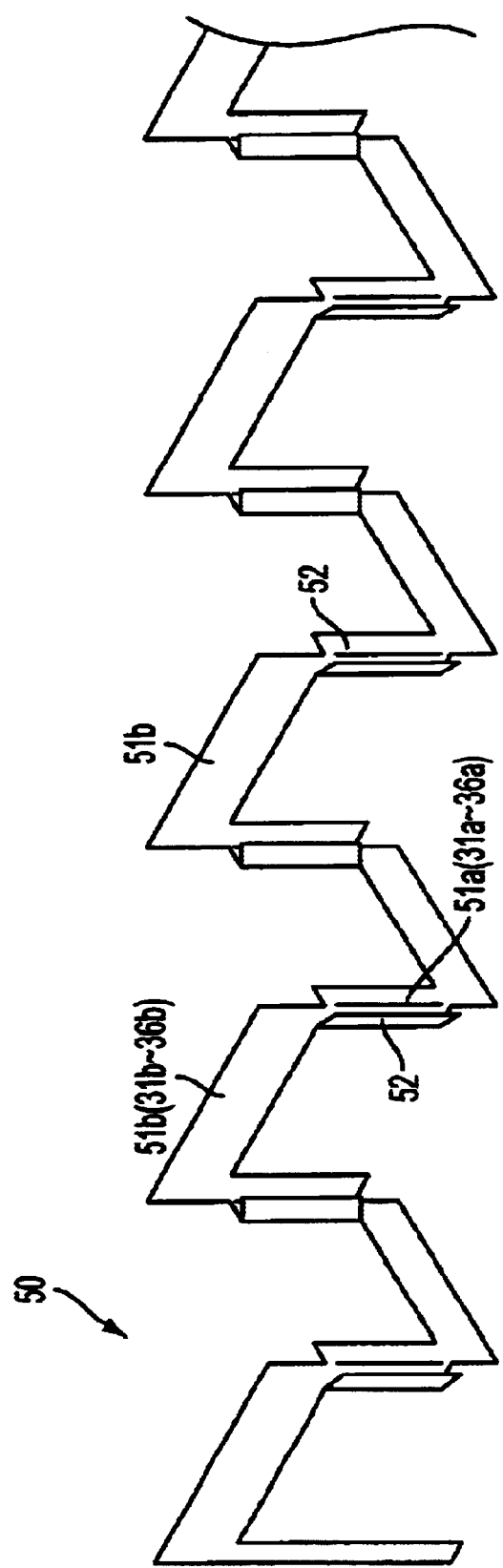
FIG. 18 is a perspective view illustrating a conductor segment unit in the course of assembly thereof according to the fourth embodiment.

In a fourth embodiment of the present invention, a bare conductor 51 of a crank-shaped configuration illustrated in FIG. 17 is formed by press working. This bare conductor 51 has bending portions 51a and connecting portions 51b connecting between the adjacent bending portions 51a. The bending portions 51a of the bare conductor 51 are bent at dotted line parts to form a conductor segment unit 50, as depicted in FIG. 18. In addition, the bending portions 51a are formed with adjustment members 52, respectively, for adjusting the cross sectional shapes of the straight portions 31a through 36a.

In the conductor segment unit 50, the bending portions 51a correspond to the straight portions 31a through 36a of the respective phase winding sections 31 through 36, and the connecting portions 51b correspond to the connecting portions 31b through 36b of the respective winding sections 31 through 36.

In this fourth embodiment, the welding process, which is required in the third embodiment when the conductor segment unit 50 are formed, is unnecessary. In the manufacture of the three phase winding 30, the processes after the formation of the conductor segment unit 50 are similar to those in the third embodiment, and hence a description thereof is omitted.

Although in the above-mentioned first through fourth embodiments, the three phase winding has been shown and described, the present invention is applicable to other polyphase windings such as, for example, a five phase winding, a seven phase winding and so on.

Moreover, the present invention is also applicable to other rotating electric machines such as an electric motor, a generator and so on.

In addition, although in the above-mentioned respective embodiments, the straight portions and the connecting portions have a rectangular cross sectional shape, the present invention is not limited to this shape but other shapes such as, for example, a generally elliptical cross sectional shape, a circular cross sectional shape and the like may of course be employed.

As described in the foregoing, the present invention provides the following advantages.

According to a stator of a rotating electric machine of the present invention, a polyphase winding is comprised of respective phase winding sections electrically connected with each other, the respective phase winding sections having straight portions inserted in slots formed in a stator core and connecting portions connecting between ends of adjacent ones of the straight portions. The respective phase winding sections include a plurality of conductor segment units wound in a spiral manner with four corners each bent substantially at right angles, the respective phase winding sections having the straight portions and the connecting portions. The conductor segment units are laminated in such a manner that parts of connecting portions of one of any two adjacent conductor segment units are interposed between adjacent connecting portions of the other adjacent conductor segment unit, and the conductor segment units are serially linked with one another in a circumferential direction. With this arrangement, the manufacturing efficiency of the stator can be improved greatly as compared with the aforementioned known stator in which serially linked respective phase winding sections each of a crank-shaped configuration are intertwined with one another to form a winding.

In addition, the four corners of the conductor segment units are bent at right angles, and hence the straight portions and the connecting portions are perpendicular with respect to each other, as a consequence of which the height of the coil end of the polyphase winding is reduced, thus making it possible to minimize the axial dimensions of the stator.

In a preferred form of the invention, the straight portions and the connecting portions each have a rectangular cross sectional shape, and hence a high density polyphase winding can be obtained.

In another preferred form of the invention, each of the conductor segment units comprises a plurality of conductor segments each of a U-shaped configuration as a whole having a base and a pair of leg portions at opposite sides of the base, and in the plurality of laminated conductor segments, one of a pair of leg portions of one conductor segment is joined to an opposed one of a pair of leg portions of an adjacent conductor segment, and the other of the pair of leg portions of the one conductor segment is joined to an opposed one of a pair of leg portions of another adjacent conductor segment. With this arrangement, it is possible to manufacture the conductor segment units with ease.

In a further preferred form of the invention, the conductor segments are formed by press molding, so they can be easily manufactured.

In a still further preferred form of the invention, the stator further comprises adjustment members arranged at joint portions at which the leg portions are joined to each other for adjusting cross sectional shapes of the straight portions. Thus, for instance, the cross sectional areas of the connecting portions and the straight portions can be easily made equal to each other.

In a yet further preferred form of the invention, each of the conductor segment units comprises a bare conductor of a crank-shaped configuration as a whole having bending portions and connecting portions connecting adjacent ones of the bending portions with each other. Thus, the conductor segment units can be easily manufactured.

In a further preferred form of the invention, each of the bending portions is formed with an adjustment portion for adjusting a cross sectional shape of a corresponding one of the straight portions. Thus, for example, it is possible to equalize the cross sectional area of each connecting portion with that of each straight portion.

In a further preferred form of the invention, the polyphase winding is a three phase winding, so it is possible to easily manufacture a stator for a three phase winding that is high in density and small in the axial size.

In a further preferred form of the invention, the number of slots in the stator core is one for each pole and each phase, and each of the straight portions has a width equal to a half of that of each of the connecting portions, and a thickness twice as large as that of the latter. With such an arrangement, the cross sectional area of the connecting portions and that of the straight portions become equal to each other, so the resistance of the connecting portions is equal to that of the straight portions.

In a further preferred form of the invention, the number of slots in the stator core is two for each pole and each phase, and each of the straight portions has a width equal to one third of that of each of the connecting portions, and a thickness thrice as large as that of the latter. With such an arrangement, the sectional area of the connecting portion and that of the straight portion become equal to each other, so the resistance of the connecting portions is equal to that of the straight portions.

In a further preferred form of the invention, the rotating electric machine is a generator motor. Thus, it is possible to easily obtain a generator motor that is high in density and small in the axial size.

While the invention has been described in terms of preferred embodiments, those skilled in the art will recognize that the invention can be practiced with modifications within the spirit and scope of the appended claims.

What is claimed is:

1. A stator of a rotating electric machine comprising:
   a stator core having slots formed therein which extend in an axial direction and arranged in a circumferentially spaced apart relation with respect to one another; and
   a polyphase winding incorporated in said slots;
   said polyphase winding comprising respective phase winding sections electrically connected with each other, said respective phase winding sections having straight portions inserted in said slots and connecting portions connecting between ends of adjacent ones of said straight portions;
   said respective phase winding sections further comprising a plurality of conductor segment units wound with four corners each bent substantially at right angles, said respective phase winding sections having said straight portions and said connecting portions;
   wherein said conductor segment units are laminated in such a manner that parts of connecting portions of one of any two adjacent conductor segment units are interposed between adjacent connecting portions of the other adjacent conductor segment unit, and said conductor segment units are serially linked with one another in a zigzag fashion in a circumferential direction.

2. The stator of a rotating electric machine according to claim 1, wherein said straight portions and said connecting portions each have a rectangular cross sectional shape.

3. The stator of a rotating electric machine according to claim 1, wherein each of said conductor segment units comprises a plurality of conductor segments each of a U-shaped configuration as a whole having a base and a pair of leg portions at opposite sides of said base, and in said plurality of laminated conductor segments, one of a pair of leg portions of one conductor segment is joined to an opposed one of a pair of leg portions of an adjacent conductor segment, and the other of said pair of leg portions of said one conductor segment is joined to an opposed one of a pair of leg portions of another adjacent conductor segment.

4. The stator of a rotating electric machine according to claim 3, wherein said conductor segments are formed by press molding.

5. The stator of a rotating electric machine according to claim 1, further comprising adjustment members arranged at joint portions at which said leg portions are joined to each other for adjusting cross sectional shapes of said straight portions.

6. The stator of a rotating electric machine according to claim 1, wherein each of said conductor segment units comprises a bare conductor of a crank-shaped configuration as a whole having bending portions and connecting portions connecting adjacent ones of said bending portions with each other.

7. The stator of a rotating electric machine according to claim 6, wherein each of said bending portions is formed with an adjustment portion for adjusting a cross sectional shape of a corresponding one of said straight portions.

8. The stator of a rotating electric machine according to claim 1, wherein said polyphase winding is a three phase winding.

9. The stator of a rotating electric machine according to claim 8, wherein the number of said slots is one for each pole and each phase, and each of said straight portions has a width equal to a half of that of each of said connecting portions, and a thickness twice as large as that of the latter.

10. The stator of a rotating electric machine according to claim 8, wherein the number of said slots is two for each pole and each phase in distributed winding, each of said straight portions has a width equal to one third of that of each of said connecting portions, and a thickness thrice as large as that of the latter.

11. The stator of a rotating electric machine according to claim 1, wherein said rotating electric machine is a motor.

* * * * *